United States Patent
Lo et al.

(10) Patent No.: US 7,313,105 B1
(45) Date of Patent: Dec. 25, 2007

(54) MECHANISM AND METHOD TO SELECT A TIME DELAY IN RESPONSE TO A COLLISION

(75) Inventors: Wing F. Lo, Plano, TX (US); Francois F. Blouin, Buisson Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1442 days.

(21) Appl. No.: 09/670,172

(22) Filed: Sep. 26, 2000

(51) Int. Cl.
  *H04B 7/216* (2006.01)
  *H04J 15/00* (2006.01)
  *G06F 15/16* (2006.01)
(52) U.S. Cl. ............... 370/320; 709/230; 370/229; 370/337; 370/445; 370/448
(58) Field of Classification Search ........... 709/251, 709/223, 230, 239, 226; 370/229, 320, 337, 370/445, 338, 448
See application file for complete search history.

(56) References Cited

U.S. PATENT DOCUMENTS

| | | | |
|---|---|---|---|
| 4,506,361 A | * | 3/1985 | Kume .................. 370/448 |
| 4,536,875 A | * | 8/1985 | Kume et al. ........... 370/448 |
| 5,268,899 A | | 12/1993 | Brown |
| 5,436,903 A | * | 7/1995 | Yang et al. ............ 370/448 |
| 5,625,626 A | * | 4/1997 | Umekita ............... 370/448 |
| 5,852,723 A | | 12/1998 | Kalkunte et al. |
| 5,963,560 A | * | 10/1999 | Kalkunte ............... 370/448 |

(Continued)

FOREIGN PATENT DOCUMENTS

EP  0 632 620 A2  1/1995

OTHER PUBLICATIONS

R. Braden, et al., Network Working Group Request for Comments : 2205, Resource Reservation Protocol (RSVP)—Version 1 Functional Specification, pp. 1-99 (Sep. 1997).

(Continued)

*Primary Examiner*—Saleh Najjar
*Assistant Examiner*—Benjamin R Bruckart
(74) *Attorney, Agent, or Firm*—Trop, Pruner & Hu, P.C.

(57) ABSTRACT

A communications system includes a network that is coupled to a number of terminals, at least some of which are capable of audio or other forms of real-time interactive data communications over the network. Each of the terminals includes a network adapter that is capable of detecting a collision with another terminal on the network. If a collision is detected, transmission of a data frame is aborted, and a backoff time delay is selected. The backoff time delay is selected from a group of delay periods that vary at a rate different than exponentially with a number of collisions. The group of one or more delay periods can contain delay periods that increase linearly with the number of collisions, delay periods that increase according to some power of n, where n is the number of collisions, or a delay period that is selected at random based on a predetermined mean backoff delay. Alternatively, the selected backoff time delay is selected from a group of delay periods that increases exponentially with the number of collisions, but with a maximum value set that is less than the maximum set according to conventional backoff algorithms.

11 Claims, 4 Drawing Sheets

U.S. PATENT DOCUMENTS 6,055,578 A * 4/2000 Williams et al. ............ 709/253
6,141,355 A * 10/2000 Palmer et al. .............. 370/465
6,167,029 A * 12/2000 Ramakrishnan ............ 370/235
6,185,601 B1   2/2001 Wolff

OTHER PUBLICATIONS

K. Nichols, et al., Network Working Group Request for Comments: 2474, Definition of the Differentiated Services Field (DS Field) in the IPv4 and IPv6 Headers, pp. 1-8 (Dec. 1998).

S. Brim, et al., Network Working Group Request for Comments: 2836, Per Hop Behavior Identification Codes, pp. 1-7 (May 2000).

Y. Bernet, draft-ieft-issll-dclass-01.txt, Format of the RSVP Dclass Object, pp. 1-6 (Oct. 1999).

S. Blake, et al., Network Working Group Request for Comments: 2475, An Architecture for Differentiated Services, pp. 1-34 (Dec. 1998).

* cited by examiner

MECHANISM AND METHOD TO SELECT A TIME DELAY IN RESPONSE TO A COLLISION

TECHNICAL FIELD

The invention relates to network access mechanisms and methods.

BACKGROUND

Traditionally, popular forms of communications over data networks include electronic mail, file transfer, web browsing, and other exchanges of data. With the increased bandwidth and speed of data networks, communications of voice and other forms of real-time interactive data have also become possible. Transmissions of real-time interactive data are more sensitive to network delays than traditional data communications, such as electronic mail, file transfer, web browsing, and so forth. Because of the real-time nature of such communications, any substantial delay in the transport of the data over the network may be noticeable at the receiving end. For example, with voice communications, network delays may result in silence, clipping, or other undesirable effects at the receiving terminal.

Various different types of data networks exist, including local area networks (LANs), wide area networks (WANs), the Internet, and so forth. Generally, a LAN provides higher communication speeds than WANs or the Internet due to the shorter network links and closer proximity of the network elements. A popular LAN technology is the 802.3 Standard from the Institute of Electrical and Electronics Engineers (IEEE), sometimes referred to as the "Ethernet."

Multiple nodes or terminals may be connected to an Ethernet network. To prevent contention between the terminals on the Ethernet network, a carrier sense multiple access with collision detection (CSMA/CD) mechanism is used. Terminals employing CSMA/CD listen to the cable that forms part of the Ethernet network to detect the presence of a carrier signal from another terminal. If another terminal is not using the network, any of the terminals connected to the Ethernet network can transmit data onto the network at will. In the event that two terminals are attempting to transmit on the network at the same time, or even during overlapping time intervals, a collision occurs. If a terminal detects a collision, it stops the transmission and backs off from accessing the network for a predetermined period of time.

The IEEE 802.3 Standard defines an exponential backoff algorithm, in which the terminal selects a time period to wait before retransmitting. The time period is chosen at random so it is likely that terminals that have collided will choose different time periods. After experiencing the nth collision in a row for a given frame, a terminal chooses a value for K at random from $[0, 1, 2, \ldots, 2^m-1]$, where m is equal min(n, 10). The terminal then waits K slot times (each slot time about 51.2 microseconds) before retransmitting. Thus, in an example, if a terminal attempts for the first time to transmit a frame and detects a collision, the terminal chooses K with equal probability from the group [0, 1]. If the terminal chooses K=0, then the terminal immediately retransmits the frame. However, if K=1, then the terminal waits about 51.2 microseconds (one slot time) before retransmitting the frame. After a second collision, K is chosen with equal probability from $[0, 1, 2, 2^2-1]$. After three collisions, K is chosen with equal probability from the group $[0, 1, 2, 3, 4, 5, 6, 2^3-1]$. After ten or more collisions, K is chosen with equal probability from $[0, 1, 2, \ldots 2^{10}-1]$. Thus, the size of the sets from which K can be chosen grows exponentially with the number of collisions in the exponential backoff algorithm.

The exponential growth in backoff delay on an Ethernet network may cause sub-optimal performance of voice and other real-time interactive communications over the Ethernet network. When compared to other forms of communications over a data network, real-time interactive communications generate a relatively small volume of data flow. However, the flow of such data is sensitive to delay. Thus, for example, if a large file is being transferred over the Ethernet network, the transfer of such data frames may cause a relatively large amount of collisions with frames carrying data associated with real-time interactive communications. As a consequence, the terminal involved in the real-time interactive communications may experience relatively large delays, due to collisions and exponential backoff, which may cause degradation of the real-time interactive communications. As the number of terminals connected to the Ethernet network increases, this problem is exacerbated because of the increase in volume of data communications.

A need thus exists for an improved method and apparatus for providing access to a network, such as an Ethernet network.

SUMMARY

In general, according to one embodiment, a method of providing access to a network comprises detecting a collision on the network during transmission of a frame and waiting a time delay before retransmitting the frame. The time delay is selected using an algorithm that varies the time delay at a rate different than an exponential rate based on a number of collisions.

Some embodiments of the invention may provide one or more of the following advantages. Delays associated with retransmissions (due to collisions) of delay-sensitive communications, such as voice or other types of communications, may be reduced. This improves the perceived quality of service by end users that are participating in voice communications. Also, for other applications that are sensitive to delays in data communications, improved performance may be achieved.

Other features and advantages will become apparent from the following description, from the drawings, and from the claims.

DETAILED DESCRIPTION

In the following description, numerous details are set forth to provide an understanding of the present invention.

However, it will be understood by those skilled in the art that the present invention may be practiced without these details and that numerous variations or modifications from the described embodiments may be possible. For example, although reference is made to Ethernet networks in the described embodiments, further embodiments may use other types of networks.

Figure 1:
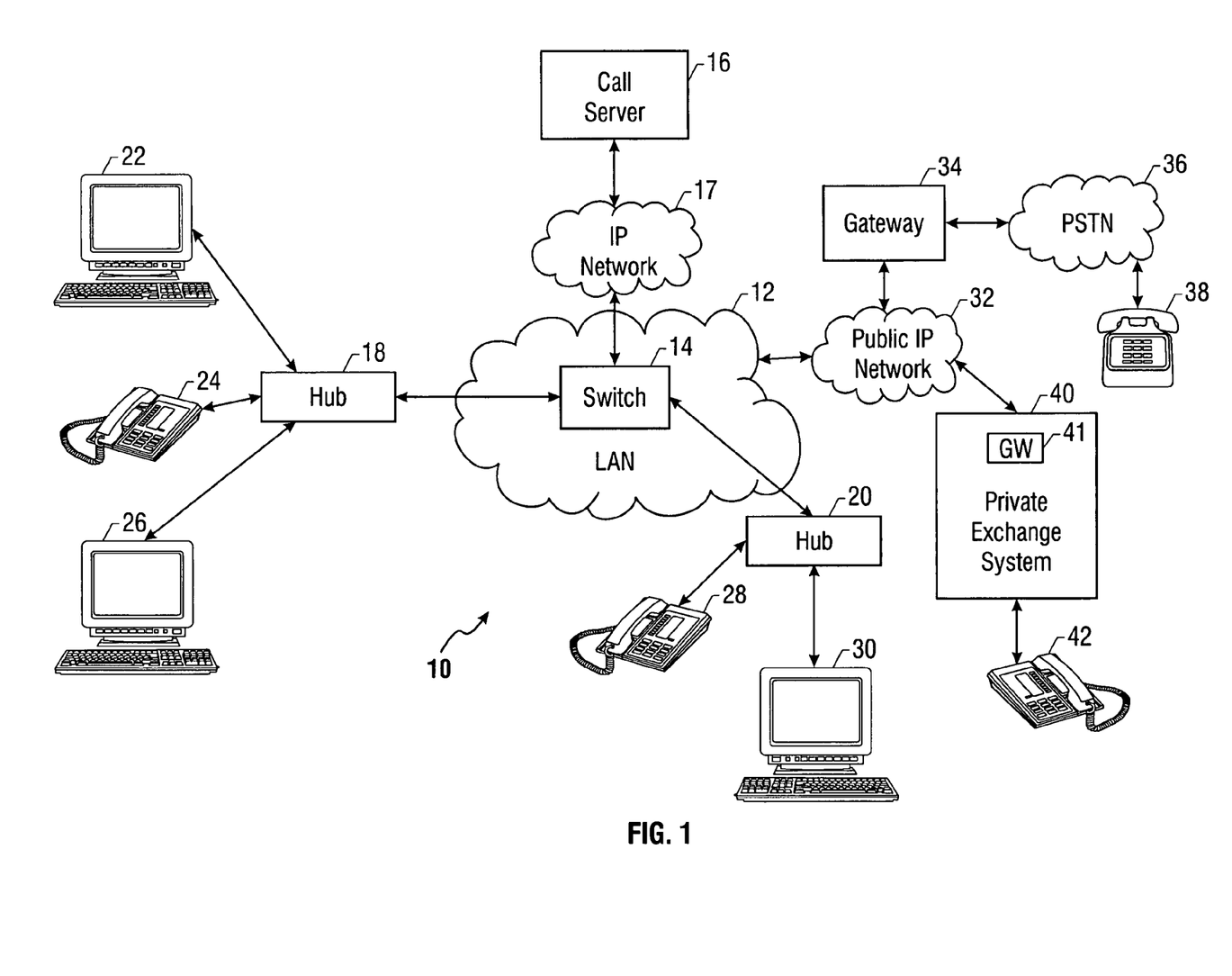
FIG. 1 is a block diagram of an embodiment of a communications system that includes an Ethernet network.

Referring to FIG. 1, a communications system 10 includes various terminals that are capable of communicating over a local area network (LAN) 12, such as an Ethernet network according to the 802.3 Standard from the Institute of Electrical and Electronics Engineers (IEEE). Terminals 22, 24, and 26 are connected to a hub 18, which enables a star configuration for the terminals 22, 24, and 26. Examples of the terminals 22 and 26 are personal computers, and an example of the terminal 24 is a telephone that is capable of communicating over the LAN 12. One example of such a telephone is the i2004 network telephone from Nortel Networks. The hub 18 essentially is a repeater that replays incoming signal to all other ports as well as perform signal regeneration to improve the signal-to-noise ratio.

The hub 18 is further connected to a switch 14 that is part of the LAN 12. The switch 14 routes frames between devices connected to the switch 14 based on addresses contained in the frames. In the illustrated arrangement, the switch 14 is further connected to a hub 20, which is connected to terminals 28 and 30. An example of the terminal 30 is a personal computer system, and an example of the terminal 28 is a network telephone.

In the illustrated example, the personal computers 22, 26 and 30 can be used for traditional forms of communications over the LAN 12, such as electronic mail, file transfer, and so forth. The network telephones 24 and 28 can be used for voice or other types of real-time interactive communications (e.g., video conferencing). If fitted with audio processing capabilities, the computers 22, 26 or 30 may also be capable of participating in voice communications.

In addition to a local connection between the terminals 22, 24, 26, 28 and 30 over the LAN 12, the switch 14 can also connect the terminals through one or more routers (not shown) to a public packet-based network 32 (e.g., a public Internet Protocol or IP network such as the Internet). One version of IP is described in Request for Comments (RFC) 791, entitled "Internet Protocol," dated September 1981. Another version of IP is IPv6, described in RFC 2460, entitled "Internet Protocol, Version 6 (IPv6) Specification," dated December 1998.

The network 32 may be connected to a private exchange system 40 (through an internal or external gateway 41). The private exchange system 40 is in turn connected to one or more telephones 42. A gateway system 34 is connected between the packet-based network 32 and a public switched telephone network (PSTN) 36 connected to various telephones 38. In a call session between a telephone 38 and one of the terminals coupled to the public network 32, the gateway system 38 is capable of translating between packet data communicated over the packet-based network 32 and circuit-switched data communicated over the PSTN 36.

A call server 16 connected to the switch 14 (through an IP network 17) provides call processing control between terminals connected to the LAN 12 or between a terminal connected to the LAN 12 and a terminal or system coupled to the public network 32. The call server 16 is responsible for routing a call to the appropriate destination terminal connected to the LAN 12 or the public network 32. In another configuration, the call server 16 can be connected directly to the LAN 12.

As used here, a "network" or "data network" may refer to one or more communications networks, channels, links or paths and devices (such as routers or switches) used to route data over such networks, channels, links or paths. A "real-time" interactive call session refers to an exchange of data, such as audio and/or video data, on a substantially real-time basis between two terminals. A session is substantially real time if interaction is occurring between two end points or parties, with a communication from one end point followed relatively quickly by a response or another communication from the other end point, typically within seconds, for example. Any substantial delay in the transmission of frames or packets carrying information associated with real-time interactive communications may result in perceived degradation of the quality of the communications or in the reliability of the communications.

In accordance with some embodiments of the invention, to reduce the delays associated with communications of such data, a backoff algorithm is employed that is modified from the exponential backoff algorithm according to the carrier sense multiple access with collision detection (CSMA/CD) protocol used in conventional Ethernet networks. As discussed, the time delay selected for retransmitting (due to collisions) according to the CSMA/CD protocol according to the IEEE 802.3 Standard can potentially grow exponentially, since the backoff time delay is selected from a group that grows exponentially with each collision. According to the IEEE 802.3 CSMA/CD protocol, after the nth collision to transmit a frame of data, a network adapter chooses, at random, a value K from the group $[0, 1, 2, \ldots, 2^{m-1}]$, m=min(n, 10). The backoff time delay is K slot times, which each slot time having a predetermined time period. In one version of Ethernet, a slot time is approximately 51.2 microseconds. The exponential growth is truncated after the tenth collision. As used here, a backoff algorithm selects a backoff delay period that varies "exponentially" with n number of collisions if the backoff delay period is selected from a group of delay periods that grow exponentially with some (but not necessarily all) values of n (e.g., n ranging from 1 to 10).

To avoid undesirably large delays that may occur due to use of a conventional exponential backoff algorithm for voice or other real-time interactive communications, some embodiments of the invention employ a backoff algorithm in which the time delay selected does not vary exponentially with the number of collisions that have occurred. For example, such a modified backoff algorithm can be a linear algorithm in which the group of possible backoff time periods grows linearly with each collision. Alternatively, a fixed backoff time period may be used, in which a random number generator may select a random backoff time period based on a fixed mean delay period. The modified backoff algorithm may also select a backoff delay that is selected from a group of delay periods that grows according to a polynomial of n, with n being the number of collisions. In all these cases, the backoff algorithm selects a backoff time period that is selected from a group of delay periods [0 . . . Dmax], where Dmax does not vary exponentially with the nth collision for n less than or equal to 10.

In another embodiment, an exponential backoff algorithm similar to the IEEE 802.3 CSMA/CD backoff algorithm may be employed except that a maximum backoff delay that is less than the 802.3 Standard maximum of 1023× slot time is defined.

By employing the modified backoff algorithm in accordance with some embodiments of the invention, improvements in performance of voice and other real-time interactive communications have been observed since a selected backoff delay for retransmission due to a collision is likely less than the selected backoff delay of the conventional exponential backoff algorithm according to CSMA/CD.

For example, simulation results in one example arrangement show that the peak end-to-end packet delay is reduced by a factor of approximately three when using a linear backoff algorithm as compared to an exponential backoff algorithm. The average end-to-end packet delay is reduced by a factor of greater than two. Although some increase in the number of collisions occur when using the linear backoff algorithm, the retransmission delay is substantially reduced due to the shorter backoff delays.

In one embodiment, the modified backoff algorithm may be used in terminals enabled for voice or other real-time interactive communications, such as network telephones 24 and 28. For the remaining terminals (which are not enabled for voice or other real-time interactive communications), the conventional CSMA/CD exponential backoff algorithm may be used when collisions are detected. This effectively gives priority to the terminals that are used primarily to perform real-time interactive communications, since they are more likely to select smaller backoff delays after collisions are detected. In an alternative arrangement, all terminals on the LAN 12 may be configured to use the modified backoff algorithm in accordance with some embodiments.

The exponential backoff algorithm used in conventional Ethernet networks is designed to provide stability to the network. If there is a large number of terminals connected to a shared media and the aggregated traffic is more than enough to saturate the shared media, then a stability problem may arise since many collisions may occur among the relatively large number of terminals. If retransmissions due to such collisions are not spread out far enough, the retransmissions may potentially flood the Ethernet network, thereby reducing performance of the network. By giving some terminals priority over other terminals, particularly those that generate relatively small volumes of data, the mean access time of such terminals may be decreased, which is important for enhanced performance of real-time interactive communications.

Another application where it is desirable to reduce mean access time for terminals is in manufacturing process control environments. In such environments, it is important for control signals to be quickly and reliably communicated between various terminals. By employing modified backoff algorithms according to some embodiments, latency in communications may be reduced to provide the desired level of performance.

One example of a linear backoff algorithm is selecting a delay period K×slot time, where K is selected from the group $[0, 1, \ldots, j \times n]$, where n represents the nth collision in the transmission of a data frame and j can be any arbitrary number greater than or equal to one. In some arrangements, a maximum value for j×n may be specified. For a fixed time backoff algorithm, a predetermined mean delay period may be selected. The selected mean delay period is used by a random number generator to select a random backoff delay period. Yet another backoff algorithm selects a delay period K×slot time, where K is selected from the group $[0, 1, \ldots, n^i]$, wherein i is greater than one. Example values for i are 1, 2, or 3.

Another backoff algorithm is one in which the group of possible K values increases exponentially with each collision but a maximum time delay is specified that is less than the maximum delay period of the conventional CSMA/CD backoff algorithm. Thus, in some embodiments, the delay period K×slot time selected is based on a K selected from the group $[0, 1, \ldots, 2^m]$, with m being min(0, r), r less than 10. For example, r can be less than or equal to 9, 8, 7, 6, 5, 4, 3, or 2.

Figure 2:
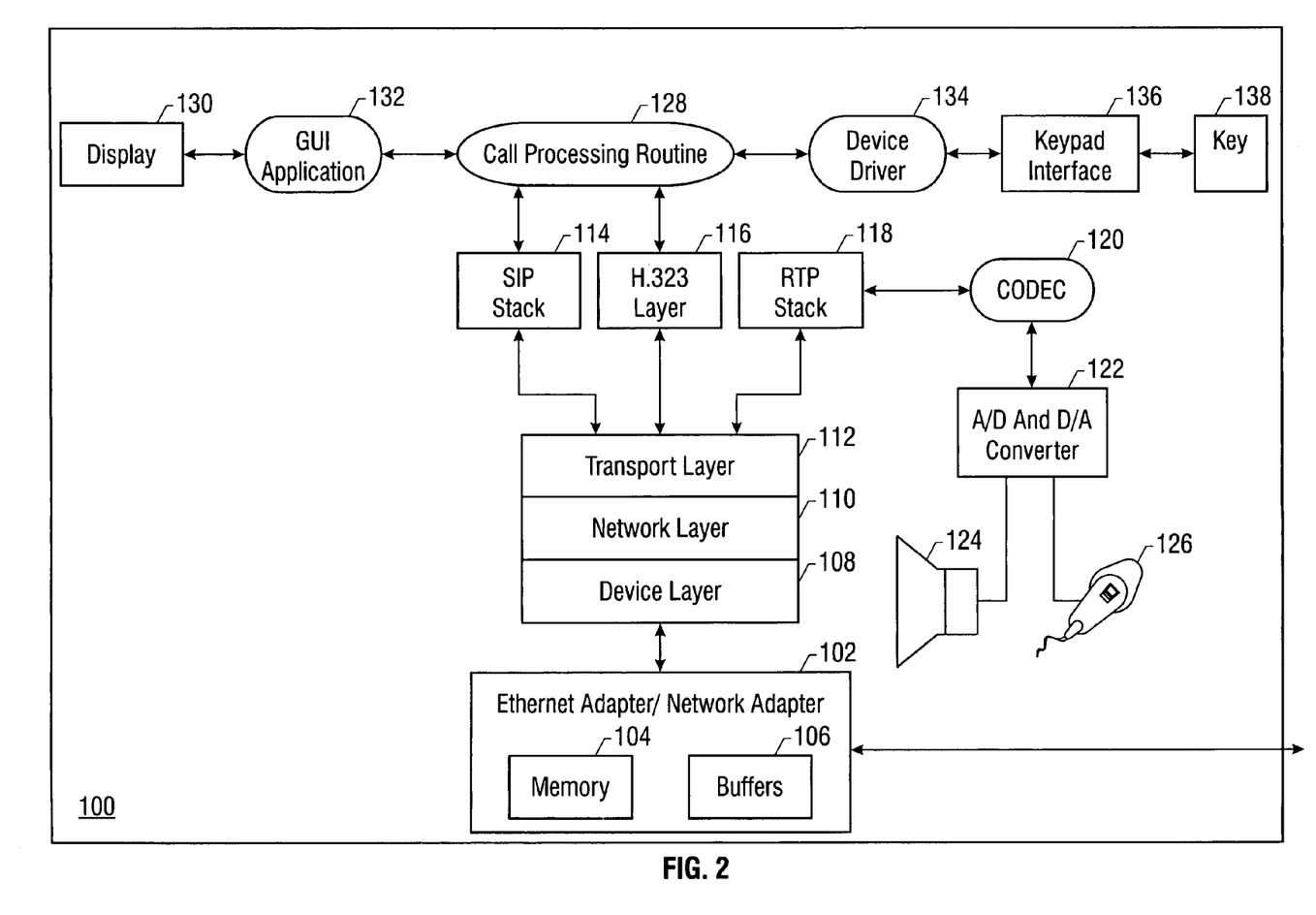
FIG. 2 is a block diagram of components in a terminal used in the communications system of FIG. 1, in accordance with an embodiment.

Referring to FIG. 2, components of a terminal 100 are illustrated. The terminal 100 can be any one of the terminals shown in FIG. 1 that are capable of participating in voice or other real-time interactive communications over the LAN 12. The terminal 100 includes a network adapter (e.g., an Ethernet adapter) that provides an interface to the LAN 12. In the illustrated arrangement of FIG. 1, the network adapter 102 communicates through a hub (18 or 20) to the LAN 12. The network adapter 102 contains a memory 104 as well as buffers 106. The buffers 106 are used to temporarily store inbound and outbound data. The memory 104, which may be non-volatile memory, for example, may be used to store instructions for programming the network adapter 102 to perform predetermined tasks.

The network adapter 102 communicates with software layers of the terminal 100 through a device driver 108, a network layer 110, and a transport layer 112. An example network layer 110 is an IP layer that provides for packet-switched communications over data networks. In further embodiments, other types of packet-based standards may be employed, including connection-oriented standards such as Asynchronous Transfer Mode (ATM) and Frame Relay standards.

An example transport layer 112 is a User Datagram Protocol (UDP) layer. UDP is described in RFC 768, entitled "User Datagram Protocol," dated August 1980. The UDP layer manages connections between network elements over an IP network.

In addition to the network and transport layers, a layer may be provided in the terminal 100 that controls the generation and parsing of call requests, such as call requests for establishing the call sessions over the LAN 12 and the public network 32. One such layer may be a Session Initiation Protocol (SIP) stack 114 that generates (for outbound call requests) or parses (for inbound call requests) SIP messages. The SIP messages may be messages inviting a terminal to participate in a call session as well as various response messages indicating various stages of the progress of a call session setup. A version of SIP is described in RFC 2543, entitled "SIP: Session Initiation Protocol," dated August 1999.

In an alternative embodiment, instead of a SIP stack 114, an H.323 layer 116 may be provided in the terminal 100. The H.323 Recommendation, from the International Telecommunication Union (ITU), also provides for call session setup and termination over data networks. Thus, whereas the SIP stack 114 communicates SIP messages, the H.323 layer 116 communicates H.323 messages.

Once a call session has been established by either the SIP stack 114 or the H.323 layer 116, a media path is established between two terminals involved in the call session. One protocol that provides for the exchange of media through the defined path is a Real-Time Protocol (RTP), as described in RFC 1889, entitled "RTP: A Transport Protocol for Real-Time Applications," dated January 1996. The RTP stack 118 transports real-time data and provides quality of service (QoS) feedback. Inbound media data is communicated through the network adapter 102, device driver 108, network layer 110, and transport layer 112 to the RTP stack 118, which communicates the received data to an audio coder/decoder (CODEC) 120, and alternatively or in addition to, a video CODEC (not shown). Outbound media is forwarded by the CODEC 120 to the RTP stack 118, which forwards the media data to the layers 112, 110, 108 and 102.

The audio CODEC 120 is further connected to an analog-to-digital (A/D) and digital-to-analog (D/A) converter 122. The converter 122 is connected to a speaker 124 (to output audio signals) and a microphone 126 (to receive audio signals).

Control signaling is communicated between the SIP stack 114 or H.323 layer 116 and a call processing routine 128, which may be an application-level software routine. The call processing routine 128 determines if an incoming call has been received or if an outgoing call is desired by the user of the terminal 100. An outgoing call may be indicated by activation of keys on a keypad 138, or alternatively, by selection of a menu item, icon, and the like in a display 130 of the terminal 100. Activation of keys 138 is received by a keypad interface 136, which communicates through a device driver 134 to the call processing routing 128. A graphical user interface (GUI) application 132 controls the display of a graphical user interface in the display 130. The GUI application 132 also receives selection of various GUI items in the display 130 by the user, and communicates such selection to the call processing routine 128.

If an incoming call is received by the call processing routine 128, an indication may be provided to the user. This may be in the form of a ring (by activating a ringer, not shown), or providing an indication in the display 130. The user may then answer the call by either making a selection in the display 130, activating a predetermined key 138, or lifting a handset (not shown). For an outgoing call, the call processing routine 128 sends a request to the SIP stack 114 or H.323 layer 116, which then generates a call request for communication through the network adapter 102 to the network.

Figure 3:
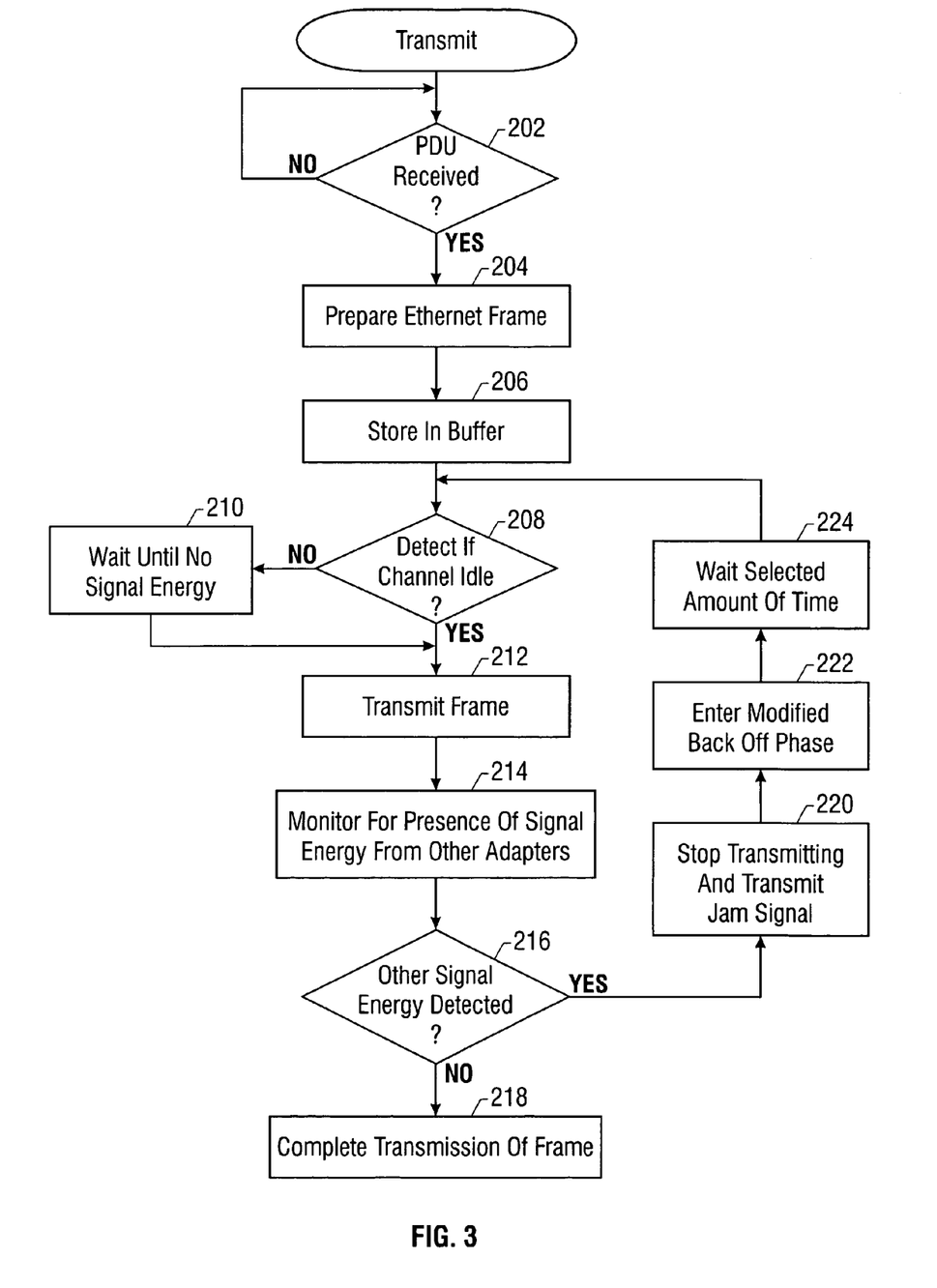
FIG. 3 is a flow diagram of a process performed by the terminal of FIG. 2 for transmitting data over the Ethernet network of FIG. 1, in accordance with an embodiment.

When transmitting on a network, the network adapter 102 is responsible for determining if contention exists on the network channel, and if so, to perform a backoff algorithm. As used here, "network channel" refers to the shared wires or links on which contention between plural terminals may occur. The network channel may also be a hub, such as hub 18 or 20. Referring to FIG. 3, a flow diagram is illustrated of the process of transmitting a frame of data to the LAN 12 (in this case, through the hub 18 or 20). The network adapter 102 first determines if a packet data unit (PDU) has been received from the upper layers in the terminal 100. If so, the network adapter prepares (at 204) an Ethernet frame for transmission. The frame may be stored (at 206) in the buffers 106 (FIG. 2). Multiple outbound frames may be present in the buffers 106.

Next, the network adapter 102 detects (at 208) if the output channel is idle. This is performed by detecting if signal energy from another network adapter is present on the channel. If the channel is busy, then the network adapter waits (at 210) until no signal energy is detected for some predetermined amount of time.

The network adapter 102 then transmits (at 212) the frame to the channel. While transmitting, the network adapter 102 monitors (at 214) for the presence of signal energy from other network adapters. If no other signal energy is detected (at 216), then the transmission of the frame can be completed (at 218).

However, if another signal energy is detected (at 216) during transmission, then a collision has been detected. The network adapter then stops (at 220) transmission of the frame and transmits a jam signal. To ensure that all terminals detect a collision, a jam signal is provided in response to a collision since the transmitted frame bits may not be sufficient for other terminals to detect a collision.

Next, the network adapter 102 enters a backoff phase (at 222) in accordance with some embodiments of the invention. Based on the modified backoff algorithm, a time delay for the wait period is selected. The terminal 100 waits this selected amount of time delay (at 224) before retransmitting.

In an alternative embodiment, the network adapter 102 is further able to apply the modified backoff algorithm to certain classes of communications. For example, a computer may be capable of performing both real-time interactive communications (e.g., voice communications) and conventional data communications (e.g., e-mail, web browsing). The modified backoff algorithm is applied to data associated with the real-time interactive communications, but not for the data associated with the conventional data communications. In one implementation, whether to apply the modified backoff algorithm can be based on a priority level associated with the priority scheme specified by the IEEE 802.1p and 802.1q standards. The IEEE 802.1q standard specifies eight levels of priority, which can be set by static provisioning or dynamically using RSVP (ReSource Reservation Protocol) for DiffServ signaling. RSVP, described in Request for Comments (RFC) 2205, entitled "Resource Reservation Protocol (RSVP)," dated Sep. 19, 1997, identifies and reserves resources for traffic over a data network.

The DiffServ (differentiated services) framework is a mechanism for providing differentiated classes of service for network traffic. To provide quality of service under DiffServ, classifications of network traffic are provided to give preferential treatment to applications (e.g., real-time interactive communications) identified as having more demanding requirements. DiffServ is further described in RFC 2475, entitled "An Architecture for Differentiated Services," dated December 1998; RFC 2474, entitled "Definition of the Differentiated Services Field (DS Field) in the IPv4 and IPv6 Headers," dated December 1998; and RFC 2836, entitled "Per Hop Behavior Identification Codes," dated May 2000.

One example of mechanics of using RSVP signaling for effecting admission control and applying QoS policy within a DiffServ network is described in Internet Draft draft-ietf-issll-dclass-01.txt, entitled "Format of the RSVP DCLASS Object," dated October 1999. This mechanism involves use of a predetermined RSVP message object (the DCLASS object) to dynamically assign differentiated services code points (DSCPs), which can be used to set the priority levels noted above.

Figure 4:
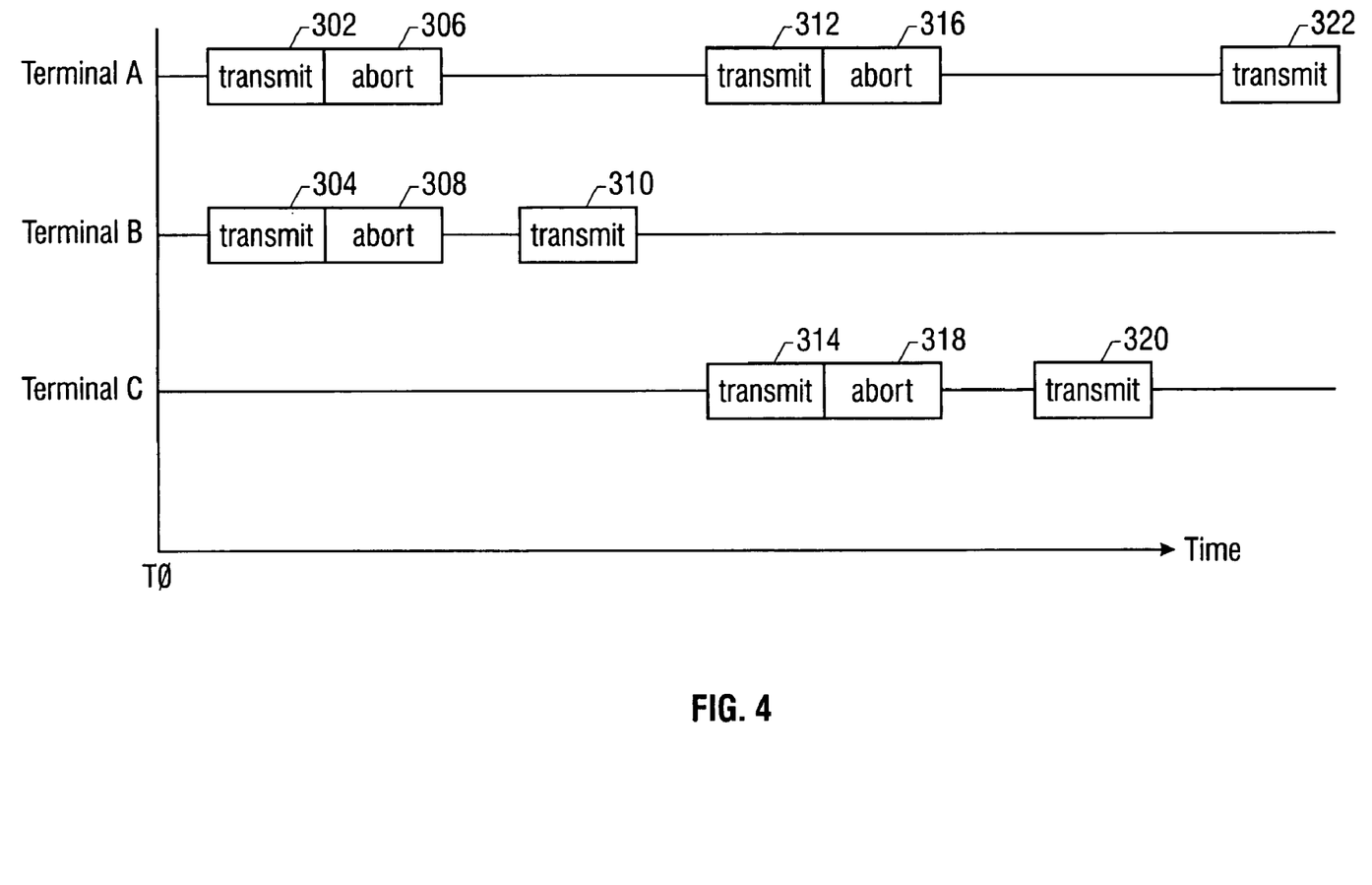
FIG. 4 illustrates an example of collisions occurring between terminals connected to the Ethernet network of FIG. 1 and retransmissions performed after time delays selected using a backoff algorithm in accordance with an embodiment.

Referring to FIG. 4, an example is provided of how collision may occur between terminals A, B, and C and the backoff performed by the terminals in response to a detected collision. As shown in FIG. 4, at time T0, terminals A and B detect that the network channel is idle, so that both terminals A and B start transmitting (302 and 304). A collision is then detected by the network adapters in terminals A and B, which causes the network adapters to abort (306 and 308) the transmission of the respective frames. A backoff time delay period is then selected by each of the network adapters in terminals A and B. Because the time delay is selected at random, it is likely that a different time delay period is selected. In the example, the time delay period selected by terminal B is smaller than the time delay selected by terminal A. Terminal B starts the first retransmission of the frame (at 310). Terminal A, after waiting its selected time period, then retransmits its frame (at 312). However, in about the same time period, terminal C starts transmitting its frame (at 314). The network adapters in terminals A and C detect the collision and both abort the transmissions of respective frames (at 316 and 318).

The network adapters of terminals A and C both enter the backoff phase, with terminal C selecting a first time delay period and terminal A selecting a second time delay period. The group of time delay periods that the network adapter of terminal A can select from is larger than the group of time delay periods that terminal C can select from, since this is terminal A's second collision and terminal C's first collision. Thus, it is likely that terminal A will select a larger backoff time period than terminal C. Terminal C thus first retransmits its frame (320), followed by a second retransmission of the frame by terminal A (322).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of providing access to a network, comprising:
   detecting a collision on the network during transmission of a frame;
   waiting a first time delay before retransmitting the frame; and
   selecting the first time delay using a first algorithm that varies the first time delay at a rate less than an exponential rate based on a number of collisions,
   wherein the acts of detecting, waiting, and selecting are performed by a first terminal, the method further comprising another terminal:
   detecting the collision;
   waiting a second time delay before retransmitting a frame from the other terminal; and
   selecting the second time delay using a second algorithm that varies the second time delay exponentially with a number of collisions.

2. The method of claim 1, wherein selecting the first time delay using the first algorithm comprises selecting a delay period from a group of delay periods that grows at a rate less than exponentially with the number of collisions.

3. The method of claim 1, wherein selecting the first time delay using the first algorithm comprises selecting a delay period from a group of delay periods that grows at a rate less than exponentially with n collisions, where n is less than or equal to 10.

4. The method of claim 1, wherein selecting the first time delay uses the first algorithm that varies the time delay linearly with the number of collisions.

5. The method of claim 4, wherein selecting the first time delay comprises selecting a time delay, K×time, where K is selected from the group [0 through j×n], j being greater than or equal to one, where n indicates a number of detected collisions.

6. The method of claim 1, wherein selecting the first time delay is performed using an algorithm that varies the time delay according to a polynomial of n, where n is the number of collisions.

7. The method of claim 1, wherein selecting the first time delay comprises selecting the first time delay from a group of delay periods ranging from 0 to Dmax, where Dmax varies with N, where the detected collision is an Nth detected collision, and where Dmax varies less than exponentially with N for N less than or equal to 10.

8. A network system, comprising:
   a network;
   a first terminal having a first network adapter capable of communicating over the network;
   a second terminal having a second network adapter capable of communicating over the network;
   the first network adapter to employ a first backoff algorithm in response to a collision, and the second network adapter to employ a second, different backoff algorithm in response to the collision,
   wherein the first backoff algorithm comprises an exponential backoff algorithm that selects a backoff delay from a group of delay periods that increases exponentially with a number of collisions,
   wherein the second backoff algorithm comprises an algorithm that selects a backoff delay from a second group of one or more delay periods that varies at less than exponentially with a number of collisions.

9. The network system of claim 8, wherein the second group contains a random delay period randomly selected based on a predetermined mean delay period.

10. The network system of claim 8, wherein the second group of delay periods increases linearly with a number of collisions.

11. The network system of claim 8, wherein the second group of delay periods increases according to a polynomial of n, where n is a number of collisions.

* * * * *